US010003637B2

(12) United States Patent
E

(10) Patent No.: US 10,003,637 B2
(45) Date of Patent: Jun. 19, 2018

(54) METHOD, MOBILE TERMINAL AND SYSTEM FOR DISPLAYING PICTURE BASED ON WIRELESS NETWORK, AND STORAGE MEDIUM

(71) Applicant: Tencent Technology (Shenzhen) Company Limited, Guangdong (CN)

(72) Inventor: Wanyou E, Guangdong (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 508 days.

(21) Appl. No.: 14/328,777

(22) Filed: Jul. 11, 2014

(65) Prior Publication Data

US 2015/0006607 A1 Jan. 1, 2015

Related U.S. Application Data

(63) Continuation of application No. PCT/CN2013/089998, filed on Dec. 19, 2013.

(30) Foreign Application Priority Data

Jun. 27, 2013 (CN) .......................... 2013 1 0263227

(51) Int. Cl.
*H04W 8/24* (2009.01)
*H04L 29/08* (2006.01)

(52) U.S. Cl.
CPC .............. *H04L 67/10* (2013.01); *H04L 67/02* (2013.01); *H04L 67/2847* (2013.01); *H04L 67/1095* (2013.01)

(58) Field of Classification Search
CPC ..... H04L 67/10; H04L 67/2847; H04L 67/02; H04L 67/1095
See application file for complete search history.

(56) References Cited

U.S. PATENT DOCUMENTS 8,291,312 B1* 10/2012 Zhou ................. G06F 17/30902
709/203
8,788,572 B1* 7/2014 Walsh ..................... H04L 29/06
709/203

(Continued)

FOREIGN PATENT DOCUMENTS

CN 101640728 2/2010
CN 102109989 6/2011

(Continued)

OTHER PUBLICATIONS

International Search Report, PCT/CN2013/089998, Tencent Technology (Shenzhen) Company Limited, dated Apr. 3, 2014.

(Continued)

*Primary Examiner* — Oanh Duong
(74) *Attorney, Agent, or Firm* — Harness, Dickey & Pierce, P.L.C.

(57) ABSTRACT

Disclosed are a method, a mobile terminal and a system for displaying a picture based on a wireless network, and a storage medium, where the picture includes a picture identifier, picture content data and update time, and the method includes: obtaining update time of a target picture to be displayed from a server according to a picture identifier of the target picture; if a buffered picture with the same picture identifier as that of the target picture is present in a local buffer of a mobile terminal, obtaining the buffered picture; and if the update time of the buffered picture is the same as that of the target picture, displaying the buffered picture according to the picture content data of the buffered picture.

16 Claims, 3 Drawing Sheets

(56) References Cited

U.S. PATENT DOCUMENTS

| | | | | |
|---|---|---|---|---|
| 2002/0101443 | A1* | 8/2002 | Yamaguchi | G06F 17/30067 715/730 |
| 2003/0061449 | A1* | 3/2003 | Beyda | G06F 17/30902 711/133 |
| 2005/0157186 | A1* | 7/2005 | Tsuji | H04N 5/272 348/231.3 |
| 2006/0069746 | A1* | 3/2006 | Davis | H04L 67/28 709/218 |
| 2008/0235708 | A1* | 9/2008 | Lopez | G06F 17/3089 719/311 |
| 2009/0157847 | A1* | 6/2009 | Shibata | G06F 17/3028 709/218 |
| 2011/0013754 | A1* | 1/2011 | Martino | H04M 1/573 379/88.2 |
| 2011/0119355 | A1* | 5/2011 | Hwang | G06F 9/4443 709/219 |
| 2011/0126138 | A1* | 5/2011 | Kawai | G06F 3/04845 715/765 |
| 2012/0005630 | A1* | 1/2012 | Ohba | G06F 3/1462 715/853 |
| 2013/0033618 | A1* | 2/2013 | Kato | G06T 7/0046 348/234 |
| 2013/0243176 | A1* | 9/2013 | Martino | H04L 67/306 379/207.02 |
| 2013/0339469 | A1* | 12/2013 | Yolleck | H04L 67/2842 709/213 |
| 2014/0278742 | A1* | 9/2014 | MacMillan | G06Q 30/0201 705/7.29 |
| 2014/0337408 | A1* | 11/2014 | Workman | H04L 67/06 709/203 |
| 2014/0379841 | A1* | 12/2014 | Zong | G06F 17/30902 709/213 |
| 2015/0052178 | A1* | 2/2015 | Zhong | G06F 17/30109 707/823 |

FOREIGN PATENT DOCUMENTS

| | | | |
|---|---|---|---|
| CN | 102307234 | A | 1/2012 |
| CN | 102402518 | | 4/2012 |
| CN | 102479250 | A | 5/2012 |
| CN | 103532564 | A * | 1/2014 |

OTHER PUBLICATIONS

Patent Abstract of CN101640728, Device and Method for Quickly Accessing Service Page for Mobile Terminal, Shenzhen Wuju Technology Co. Ltd., Feb. 3, 2010.

Patent Abstract of CN102109989, Method, Device and System for Controlling Browser Cache, Alibaba Group Holding Ltd., Jun. 29, 2011.

Patent Abstract of CN102402518, Method and Device for Accessing Webpage, China Mobile Comm. Co. Ltd., Apr. 4, 2012.

* cited by examiner

METHOD, MOBILE TERMINAL AND SYSTEM FOR DISPLAYING PICTURE BASED ON WIRELESS NETWORK, AND STORAGE MEDIUM

CROSS-REFERENCE TO RELATED APPLICATIONS

This application claims priority to and is a continuation application of PCT/CN2013/089998, filed on Dec. 19, 2013 and entitled "METHOD, MOBILE TERMINAL AND SYSTEM FOR DISPLAYING PICTURE BASED ON WIRELESS NETWORK, AND STORAGE MEDIUM", which claims the priority of Chinese Patent Application No. 201310263227.0, filed on Jun. 27, 2013 by Tencent Technology (Shenzhen) Co., Ltd., titled "METHOD, MOBILE TERMINAL AND SYSTEM FOR DISPLAYING PICTURE BASED ON WIRELESS NETWORK", which are incorporated herein by reference in their entirety.

FIELD OF THE INVENTION

The present disclosure relates to the field of wireless network technologies, and in particular, to a method, a mobile terminal and a system for displaying a picture based on a wireless network, and a storage medium.

BACKGROUND OF THE INVENTION

With the development of communications, the mobile Internet has been widely applied. Typically, pictures are displayed on a web page received wirelessly in the mobile Internet. At present, pictures are displayed on the web page received wirelessly in the following two picture display solutions.

In a first picture display solution where a picture will not be buffered, the browser sends a picture acquisition request for each picture to a server, upon detection of each event where a user opens or refreshes a web page. This solution has a disadvantage that a certain amount of network traffic, which is very precious for the user of the mobile Internet, is required for the picture each time the user accesses the same web page. Additionally, some response time is taken by the mobile terminal to request a picture from the server, especially in a 2G or 3G wireless network environment, thus the display of the picture is delayed, which greatly degrades the display effect of the web page received wirelessly in the mobile Internet.

In a second picture display solution, a picture is converted into a base 64-encoded character string through HTML5 canvas technologies and buffered in a local storage (e.g. localStorage). Due to the limited space of the local storage, the outdated buffered pictures will be removed from the local storage by periodically emptying the buffers in the local storage to release the space of the local storage, for the purpose of new buffering operations. In this solution, although a picture is buffered in the local storage, all buffers in the local storage needs to be emptied to remove the outdated buffered pictures, for the purpose of new buffering operations. In this solution, the buffering efficiency and the usage of buffers in the local storage are low, because valid buffer records are cleaned at the same time. Additionally, it is difficult to determine the cleaning period of the local storage, because if the cleaning period is too short, the usage of the buffered pictures will be lowered, and if the cleaning period is too long, the validity of the buffered pictures will be lowered.

SUMMARY OF THE INVENTION

Therefore, the present disclosure provides a method for displaying a picture based on a wireless network, a mobile terminal and a system for displaying a picture based on a wireless network, and a storage medium, to save the network traffic of a mobile terminal, improve the page display speed, improve and the battery endurance of the mobile terminal.

On the first aspect, an embodiment of the disclosure provides a method for displaying a picture based on a wireless network, where the picture includes a picture identifier, picture content data and update time, and the method includes:

obtaining update time of a target picture to be displayed from a server according to a picture identifier of the target picture;

if a buffered picture with the same picture identifier as that of the target picture is present in a local buffer of the mobile terminal, obtaining the buffered picture; and if the update time of the buffered picture is the same as that of the target picture, displaying the buffered picture according to the picture content data of the buffered picture.

On the second aspect, an embodiment of the disclosure provides a mobile terminal for performing a method for displaying a picture based on a wireless network, where the picture includes a picture identifier, picture content data and update time, and the mobile terminal includes:

an update time obtaining unit, configured to obtain update time of a target picture to be displayed from a server according to a picture identifier of the target picture;

a local picture obtaining unit, configured to, if a buffered picture with the same picture identifier as that of the target picture is present in a local buffer of the mobile terminal, obtain the buffered picture; and a local picture display unit, configured to display the buffered picture according to the picture content data of the buffered picture if the update time of the buffered picture is the same as that of the target picture.

On the third aspect, an embodiment of the disclosure provides a system for displaying a picture based on a wireless network, where the picture includes a picture identifier, picture content data and update time, and the system includes a mobile terminal and a server;

the mobile terminal is configured to obtain the update time of a target picture to be displayed from the server according to the picture identifier of the target picture; and if a buffered picture with the same picture identifier as that of the target picture is present in a local buffer of the mobile terminal, the mobile terminal obtains the buffered picture; or if the update time of the buffered picture is the same as that of the target picture, the mobile terminal displays the buffered picture according to the picture content data of the buffered picture.

On the fourth aspect, an embodiment of the disclosure provides a storage medium containing computer-executable instructions, which, when executed by a computer processor, are configured to perform a method for displaying a picture based on a wireless network, where the picture includes a picture identifier, picture content data and update time, and the method includes:

obtaining update time of a target picture to be displayed from a server according to a picture identifier of the target picture;

if a buffered picture with the same picture identifier as that of the target picture is present in a local buffer of the mobile terminal, obtaining the buffered picture; and if the update time of the buffered picture is the same as that of the target picture, displaying the buffered picture according to the picture content data of the buffered picture.

The technical solutions of the embodiments of the disclosure are advantageous as follows.

The picture content data and the update time of a picture are stored in a local buffer of a mobile terminal in the disclosure. To display a picture by a browser at the mobile terminal, the browser requests the update time of the picture from a server, and if the picture is present in the local buffer and the update time of the picture present in the buffer is consistent with the update time obtained from the server, the picture is obtained directly from the local buffer. By the technical solutions of the embodiments of the disclosure, the network traffic of a mobile terminal can be saved, the picture display speed at the mobile terminal can be improved, and the battery endurance of the mobile terminal can be improved.

BRIEF DESCRIPTION OF THE DRAWINGS

In order to more clearly illustrate the technical solutions of the embodiments of the disclosure, the drawings accompanying with the description of the embodiments will be briefly introduced below. However, the drawings accompanying with the description below illustrate only some embodiments of the disclosure, and other drawings may also be obtained by one of ordinary skills in the art in light of these drawings without creative work.

DETAILED DESCRIPTION OF THE EMBODIMENTS

In order to more clearly illustrate the technical problem to be solved by the embodiments of the disclosure, the technical solutions as employed and the technical effect as achieved, the technical solutions of the embodiments of the disclosure will be further described in detail below in conjunction with the drawings. Apparently, the embodiments described herein are only a part of the embodiments of the disclosure, rather than the whole embodiments. Therefore, all other embodiments made by one skilled in the art in light of the embodiments of the disclosure without creative work are included in the protection scope of the disclosure.

The technical solutions of the disclosure will be further illustrated by specific embodiments in conjunction with the drawings.

First Embodiment

Figure 1:
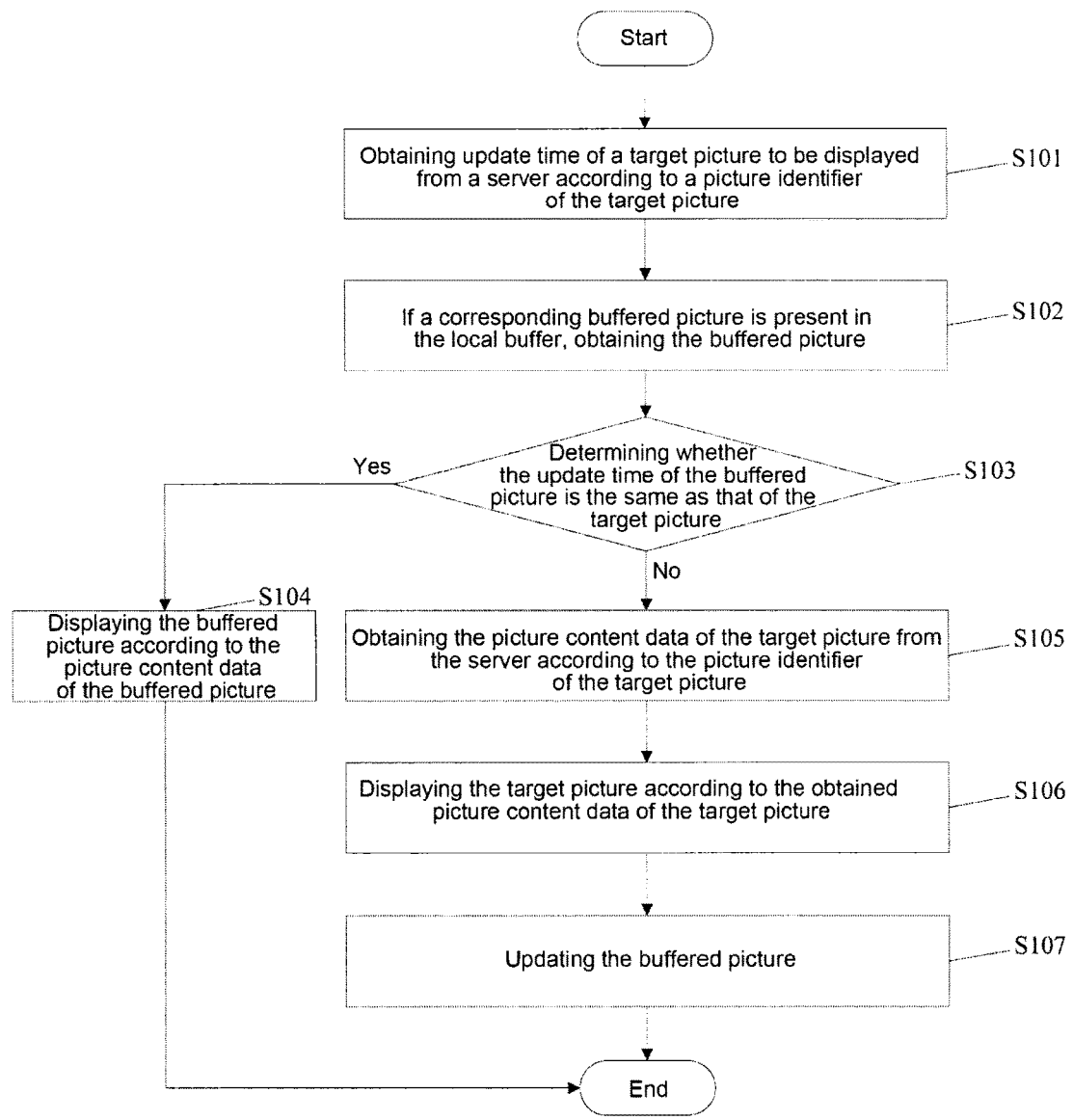
FIG. 1 is a flow chart of a method for displaying a picture based on a wireless network according to a first embodiment of the disclosure.

FIG. 1 is a flow chart of a method for displaying a picture based on a wireless network according to the first embodiment. The method may be performed by a picture display device configured in a mobile terminal, and the picture display device may be implemented in hardware and/or software mode. As shown in FIG. 1, the method for displaying a picture based on a wireless network according to the present embodiment includes the following Steps S101 to S107.

Step S101: obtaining update time of a target picture to be displayed from a server according to a picture identifier of the target picture.

When network resources are stored on a server, the update time of the network resource is stored along with the network resource, in order to distinguish between different versions of the network resource. For example, when a picture is stored, a picture identifier, picture content data and update time of the picture are stored at the same time; and when a mobile terminal requests to display the picture, the mobile terminal sends the picture identifier of the target picture for displaying (for example, a URL address of the picture) to the server, and the server queries the update time of the target picture according to the picture identifier of the target picture and returns the update time to the mobile terminal.

For example, to display a web page containing pictures, each of which is provided with a URL address, at the mobile terminal (upon a web page browsing request received from a user, for example), the mobile terminal requests the update time of each picture from the server according to the URL address of the picture.

Step S102: if a buffered picture corresponding to the picture identifier exists in a local buffer, obtaining the buffered picture.

Specifically, in Step S103, if a buffered picture with the same picture identifier as that of the target picture is present in a local buffer of the mobile terminal, the buffered picture is obtained as the corresponding target picture. In a wireless network, where network traffic is charged and is very precious for the user, pictures from the network are stored locally on the mobile terminal in the technical solution of this embodiment, in order to avoid the consumption of network traffic for requesting a picture from a server each time a web page is accessed; in this case, to display a target picture at a mobile terminal, the mobile terminal searches for the target picture to be displayed among pictures stored locally so as to save network traffic. In order to further accelerate the access speed, the locally stored pictures may be stored in the buffer of the mobile terminal. For example, at least one web page picture is stored in the buffer through the localStorage, where each picture is referred to as a buffered picture, which includes a picture identifier, picture content data and update time.

In a preferred implementation of this embodiment, the pictures from the network stored locally on the mobile terminal are particularly stored in the buffer of the mobile terminal through the HTML5 localStorage, and each buffered picture includes a picture identifier and picture content data. Each buffered picture is stored in the form of a character string converted from a JavaScript Object Notation (JSON) object. When the target picture is not found in the local buffer, the target picture will be obtained from the server and displayed, and stored in the buffer of the mobile terminal.

Step S103: determining whether the update time of the buffered picture is the same as that of the target picture, and if so, performing Step S104; otherwise, performing Step S105.

The target picture might be updated on the server side, thus before the buffered picture stored locally is used, it is necessary to verify whether the version of the locally buffered picture is consistent with that of the target picture on the server, i.e. to determine whether the update time of the buffered picture corresponding to the picture identifier of the target picture is the same as the update time of the target picture from the server.

Step S104: displaying the buffered picture according to the picture content data of the buffered picture, and ending the method.

If the update time of the buffered picture corresponding to the picture identifier of the target picture is the same as that of the target picture from the server, the buffered picture is of the latest version on the server and is applicable, and the picture content data of the buffered picture may be displayed directly.

Step S105: obtaining the picture content data of the target picture from the server according to the picture identifier of the target picture.

If the update time of the buffered picture corresponding to the picture identifier of the target picture is different from that of the target picture from the server, the buffered picture is not of the latest version on the server, and the target picture of the version on the server shall be used. In this case, the picture content data of the target picture is obtained from the server according to the picture identifier of the target picture.

Step S106: displaying the target picture according to the obtained picture content data of the target picture.

Step S107: updating the buffered picture, and ending the method.

The updating of the buffered picture specifically includes: updating the picture content data of the buffered picture as the picture content data of the target picture obtained from the server, and updating the update time of the buffered picture as the update time of the target picture obtained from the server.

In this embodiment, the above Step S101 and Step S102 may be exchanged, which also falls in the protection scope of the disclosure. Moreover, if the update time of the buffered picture is different from that of the target picture, other operations, for example, prompting the user about the difference in the update time, but preferably updating the local buffer with the latest target picture, may be further performed.

In this embodiment, the picture content data and the update time of a picture are stored in a local buffer of a mobile terminal. In this case, to display a picture by a browser at the mobile terminal, the browser requests the update time of the picture from a server, and if the picture is present in the local buffer and the update time of the picture present in the buffer is consistent with the update time obtained from the server, the picture is obtained directly from the local buffer. By the technical solutions of the embodiments of the disclosure, the network traffic of a mobile terminal can be saved, the picture display speed at the mobile terminal can be improved, and the battery endurance of the mobile terminal can be improved.

Second Embodiment

Figure 2:
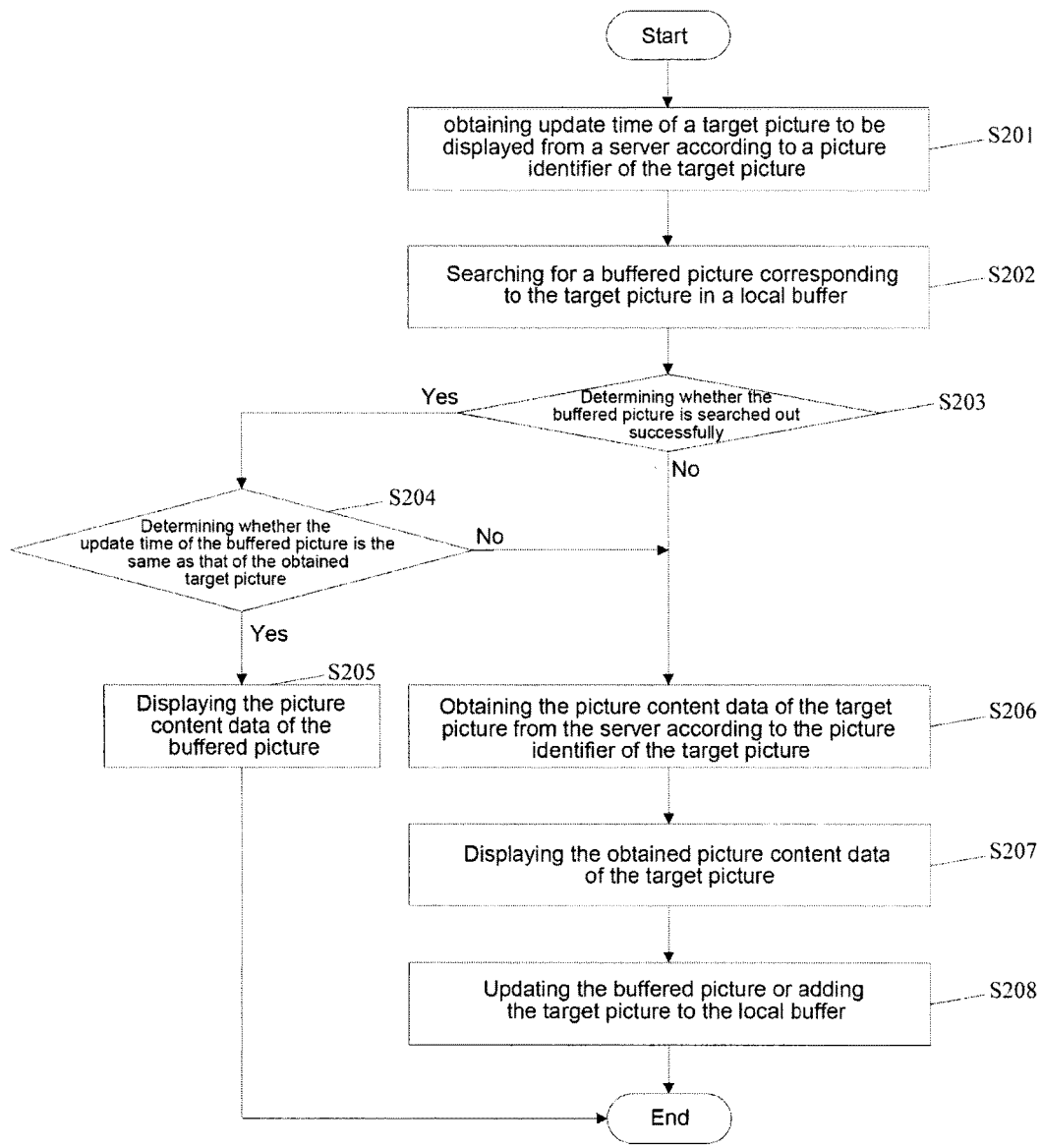
FIG. 2 is a flow chart of a method for displaying a picture based on a wireless network according to a second embodiment of the disclosure.

FIG. 2 is a flow chart of a method for displaying a picture based on a wireless network according to this embodiment. As shown in FIG. 2, the method for displaying a picture based on a wireless network according to this embodiment includes the following Steps S201-S208.

Step S201: obtaining update time of a target picture to be displayed from a server according to a picture identifier of the target picture.

When network resources are stored on a server, the update time of the network resource is stored along with the network resource, in order to distinguish between different versions of the network resource. For example, when a picture is stored, a picture identifier, picture content data and update time of the picture are stored at the same time; and when a mobile terminal requests to display the picture, the mobile terminal sends the picture identifier of the target picture for displaying (for example, a URL address of the picture) to the server, and the server queries the update time of the target picture according to the picture identifier of the target picture and returns the update time to the mobile terminal.

For example, to display a web page containing pictures, each of which is provided with a URL address, at the mobile terminal (upon a web page browsing request received from a user, for example), the mobile terminal requests the update time of each picture from the server according to the URL address of the picture.

Step S202: searching for a buffered picture corresponding to the target picture in a local buffer.

For example, it is determined, based on the picture identifier, whether a buffered picture that has the same picture identifier as the target picture is present in the local buffer of the mobile terminal.

In a wireless network, where network traffic is charged and is very precious for the user, pictures from the network are stored locally on the mobile terminal in the technical solution of this embodiment, in order to avoid the consumption of network traffic for requesting a picture from a server each time a web page is accessed; in this case, to display a target picture at a mobile terminal, the mobile terminal searches for the target picture to be displayed among pictures stored locally so as to save network traffic. In order to further accelerate the access speed, the locally stored pictures may be stored in the buffer of the mobile terminal. For example, at least one web page picture is stored in the buffer through the localStorage, where each picture is referred to as a buffered picture, which includes a picture identifier, picture content data and update time.

Further, the latest use time of the buffered picture is further recorded in the local buffer of the mobile terminal. The buffered picture may further include the latest use time, for recording the time stamp when the buffered picture as stored is used most recently; and when the space of the local buffer is insufficient, a buffered picture that has not been used for a long time (i.e., a buffered picture with early latest use time) or a buffered picture that has been hit for the minimum times will be first removed, to increase the hit ratios of the buffered pictures, and hence improve the picture display efficiency at the mobile terminal.

In a preferred implementation of this embodiment, the pictures from the network stored locally on the mobile terminal are particularly stored in the buffer of the mobile terminal through the HTML5 localStorage, and each buffered picture includes a picture identifier, picture content data, update time and the latest use time. Each buffered picture is stored in the form of a character string converted from a JSON object. When the target picture is not found in the local buffer, the target picture will be obtained from the server and displayed, and stored in the buffer of the mobile terminal.

Step S203: determining whether the buffered picture is searched out successfully; and if so, performing Step S204; otherwise, performing Step S206.

Step S204: determining whether the update time of the buffered picture is the same as the obtained update time of the target picture; and if so, performing Step S205; otherwise, performing Step S206.

The target picture might be updated on the server side, thus before the buffered picture stored locally is used, it is necessary to verify whether the version of the locally buffered picture is consistent with that of the target picture on the server, i.e. to determine whether the update time of the buffered picture corresponding to the picture identifier of the target picture is the same as the update time of the target picture from the server.

Step S205: displaying the picture content data of the buffered picture, and ending the method.

If the update time of the buffered picture corresponding to the picture identifier of the target picture is the same as that of the target picture from the server, the buffered picture is of the latest version on the server and is applicable, and the picture content data of the buffered picture may be displayed directly.

Step S206: obtaining the picture content data of the target picture from the server according to the picture identifier of the target picture.

If the update time of the buffered picture corresponding to the picture identifier of the target picture is different from that of the target picture from the server, the buffered picture is not of the latest version on the server, and the target picture of the version on the server shall be used. In this case, the picture content data of the target picture is obtained from the server according to the picture identifier of the target picture.

Step S207: displaying the obtained picture content data of the target picture.

Step S208: updating the buffered picture or adding the target picture to the local buffer, and ending the method.

If the buffered picture is searched out successfully in Step S203 and it is determined that the update time of the buffered picture is different from the obtained update time of the target picture in Step S204, the buffered picture in the mobile terminal, which corresponds to the target picture, is updated, the picture content data of the buffered picture is updated as the obtained picture content data of the target picture from the server, and the update time of the buffered picture is updated as the obtained update time of the target picture from the server. If the buffered picture locally stored on the mobile terminal further includes the latest use time, the latest use time of the buffered picture is updated as the current time.

If the buffered picture is not searched out in Step S203, that is, if a buffered picture with the same picture identifier as that of the target picture is not present in the local buffer of the mobile terminal, a new buffered picture is added to the local buffer; specifically, the picture content data of the target picture is obtained according to the picture identifier of the target picture; the obtained picture content data of the target picture is displayed; a new buffered picture is added to the local buffer, where, the picture identifier of the buffered picture is set as the picture identifier of the target picture, the picture content data of the buffered picture is set as the obtained picture content data of the target picture from the server, and the update time of the buffered picture is set as the obtained update time of the target picture from the server. If the buffered picture locally stored on the mobile terminal further includes the latest use time, the latest use time of the buffered picture is set as the current time.

In a preferred implementation of this embodiment, each time a buffered picture is stored, a picture buffering record of the localStorage is read out and converted into a JSON object, the picture to be buffered that has been converted (which is referred to as new buffered picture herein, which includes a picture identifier, picture content data, update time and the latest use time) is added to the JSON object, and the JSON object is converted into a character string and stored in the localStorage. When the remaining space of the localStorage is insufficient to store the new buffered picture, the existing buffered pictures in the localStorage are ordered according to the latest use time of the buffered pictures, and the buffered picture with the earliest latest use time is cleared, until the remaining space of the localStorage is larger than the size of the new buffered picture.

In this embodiment, the above Step S201 and Step S202 may be exchanged, which also falls in the protection scope of the disclosure.

As can be seen in this embodiment, the buffered picture in the local buffer of the mobile terminal further includes the latest use time. When a buffered picture corresponding to the target picture is not found in the local buffer, the target picture is obtained from the server and added to the local buffer; when the space in the local buffer of the mobile terminal is insufficient, the buffered pictures in the local buffer are ordered according to their latest use time, and the buffered picture with the earliest latest use time is cleared. By the method for displaying a picture based on a wireless network according to this embodiment, the hit ratio of the buffered picture locally stored on the mobile terminal may be increased, thereby improving the efficiency of displaying the picture based on the wireless network.

Third Embodiment

Figure 3:
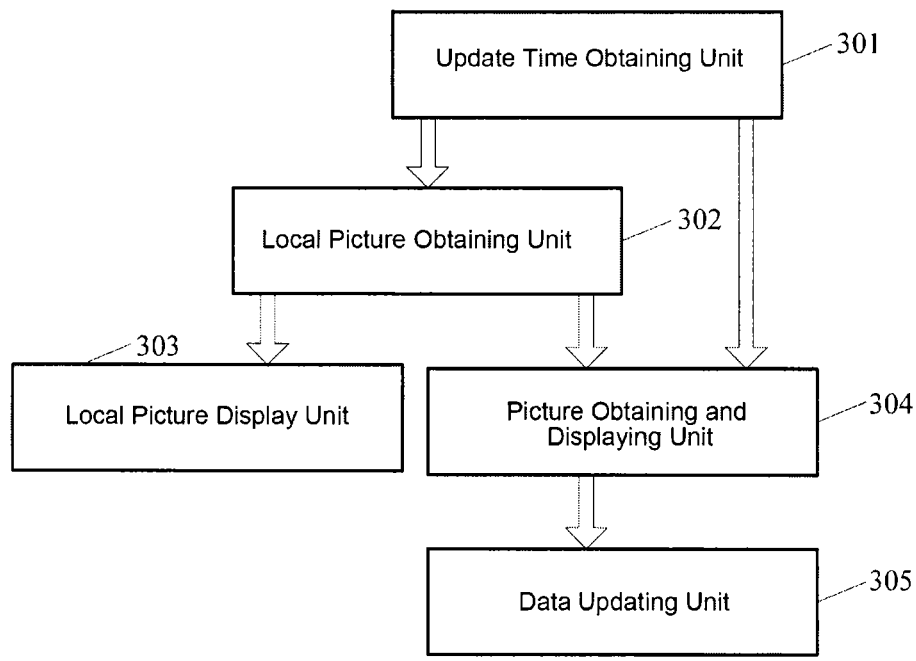
FIG. 3 is a block diagram showing the structure of a mobile terminal according to a third embodiment of the disclosure.

FIG. 3 is a block diagram showing the structure of a mobile terminal configured to perform a method for displaying a picture based on a wireless network according to this embodiment. As shown in FIG. 3, the mobile terminal according to this embodiment includes: an update time obtaining unit 301, a local search unit 302 and a local picture display unit 303.

The update time obtaining unit 301 is configured to obtain update time of a target picture to be displayed from a server according to a picture identifier of the target picture.

The local search unit 302 is configured to, if a buffered picture with the same picture identifier as that of the target picture is present in a local buffer of the mobile terminal, obtain the buffered picture; where each picture includes a picture identifier, picture content data and update time.

In order to further accelerate the access speed, the locally stored pictures may be stored in the buffer of the mobile terminal. For example, at least one web page picture is stored in the buffer through the localStorage, where each picture is referred to as a buffered picture, which includes a picture identifier, picture content data and update time.

Further, buffered picture may further include the latest use time, which is adapted to record the latest use time stamp of the buffered picture as stored; and when the space of the local buffer is insufficient, a buffered picture that has not been used for a long time (i.e., a buffered picture with early latest use time) or a buffered picture that has been hit for the minimum times will be first removed, to increase the hit ratios of the buffered pictures, and hence improve the picture display efficiency at the mobile terminal.

In a preferred implementation of this embodiment, the buffered picture on the mobile terminal is stored in the buffer through the HTML5 localStorage, and each buffered picture includes a picture identifier, picture content data, update time and the latest use time. Each buffered picture is stored in the form of a character string converted from a JSON object. When the target picture is not found in the local buffer, the target picture will be obtained from the server and displayed, and stored in the buffer of the mobile terminal.

The local picture display unit 303 is configured to display the buffered picture according to the picture content data of the buffered picture, if the update time of the buffered picture is the same as the obtained update time of the target picture from the server.

Preferably, the mobile terminal may further include: a picture obtaining and displaying unit 304 and a data updating unit 305. The picture obtaining and displaying unit 304 is configured to obtain the picture content data of the target picture from the server according to the picture identifier of the target picture and displaying the obtained picture content data of the target picture, if the update time of the buffered picture is different from that of the target picture.

The data updating unit 305 is configured to update the buffered picture after the picture obtaining and displaying unit 304 obtains the picture content data of the target picture, by updating the picture content data of the buffered picture with the obtained picture content data of the target picture, and updating the update time of the buffered picture as the obtained update time of the target picture.

The data updating unit 305 may be further configured to update the latest use time of the buffered picture as the current time.

If a buffered picture with the same picture identifier as that of the target picture is not present in the local buffer of the mobile terminal, then:

the picture obtaining and displaying unit 304 is further configured to: obtain the picture content data of the target picture from the server according to the picture identifier of the target picture, and display the obtained picture content data of the target picture; and the data updating unit 305 is further configured to add a new buffered picture to the local buffer after the picture obtaining and displaying unit 304 obtains the picture content data of the target picture, where the picture identifier of the new buffered picture is set as the picture identifier of the target picture, the picture content data of the new buffered picture is set as the obtained picture content data of the target picture, and the update time of the new buffered picture is set as the obtained update time of the target picture.

Further, adding a new buffered picture to the local buffer by the data updating unit 305 further includes: if the remaining space of the local buffer is less than the size of the new buffered picture, clearing the buffered pictures one by one from the local buffer until the remaining space of the local buffer is larger than the size of the new buffered picture.

Specifically, clearing the buffered pictures one by one from the local buffer by the data updating unit 305 specifically includes: when the remaining space of the local buffer is less than the size of the new buffered picture, ordering the buffered pictures in the local buffer according to the latest use time of the buffered pictures, and clearing the buffered picture with the earliest latest use time one by one until the remaining space of the local buffer is larger than the size of the new buffered picture.

If the local search unit 302 searches out the buffered picture successfully but the update time of the buffered picture is different from the obtained update time of the target picture, the mobile terminal updates the buffered picture in the mobile terminal, which corresponds to the target picture, where the picture content data of the buffered picture is updated as the obtained picture content data of the target picture from the server, and the update time of the buffered picture is updated as the obtained update time of the target picture from the server. If the buffered picture locally stored on the mobile terminal further includes the latest use time, the latest use time of the buffered picture is updated as the current time.

If the local search unit 302 does not search out the buffered picture, the mobile terminal adds a new buffered picture to the local buffer, where the picture identifier of the new buffered picture is set as the picture identifier of the target picture, the picture content data of the new buffered picture is set as the obtained picture content data of the target picture from the server, and the update time of the new buffered picture is set as the obtained update time of the target picture from the server. If the buffered picture stored locally on the mobile terminal further includes the latest use time, the latest use time of the new buffered picture is set as the current time.

In a preferred implementation of this embodiment, each time a buffered picture is stored, a picture buffering record of the localStorage is read out and converted into a JSON object, the picture to be buffered that has been converted (which is referred to as new buffered picture herein, which includes a picture identifier, picture content data, update time and the latest use time) is added to the JSON object, and the JSON object is converted into a character string and stored in the localStorage. When the remaining space of the localStorage is insufficient to store the new buffered picture, the existing buffered pictures in the localStorage are ordered according to the latest use time of the buffered pictures, and the buffered picture with the earliest latest use time is cleared, until the remaining space of the localStorage is larger than the size of the new buffered picture.

As can be seen in the mobile terminal according to the embodiment of the disclosure, the picture content data and the update time of a picture are stored in a local buffer. To display a picture by a browser, the browser requests the update time of the picture from a server, and if the picture is present in the local buffer, it is determined whether the update time of the picture in the local buffer is consistent with the obtained update time from the server; and if the update time of the picture in the local buffer is consistent with the obtained update time from the server, the picture is directly extracted by the browser from the local buffer, but if the update time of the picture in the local buffer is inconsistent with the obtained update time from the server, the browser extracts the picture from the server. By the technical solutions of the embodiments of the disclosure, the network traffic of a mobile terminal can be saved, the picture display speed of the mobile terminal can be improved, and the battery endurance of the mobile terminal can be improved.

Fourth Embodiment

Figure 4:
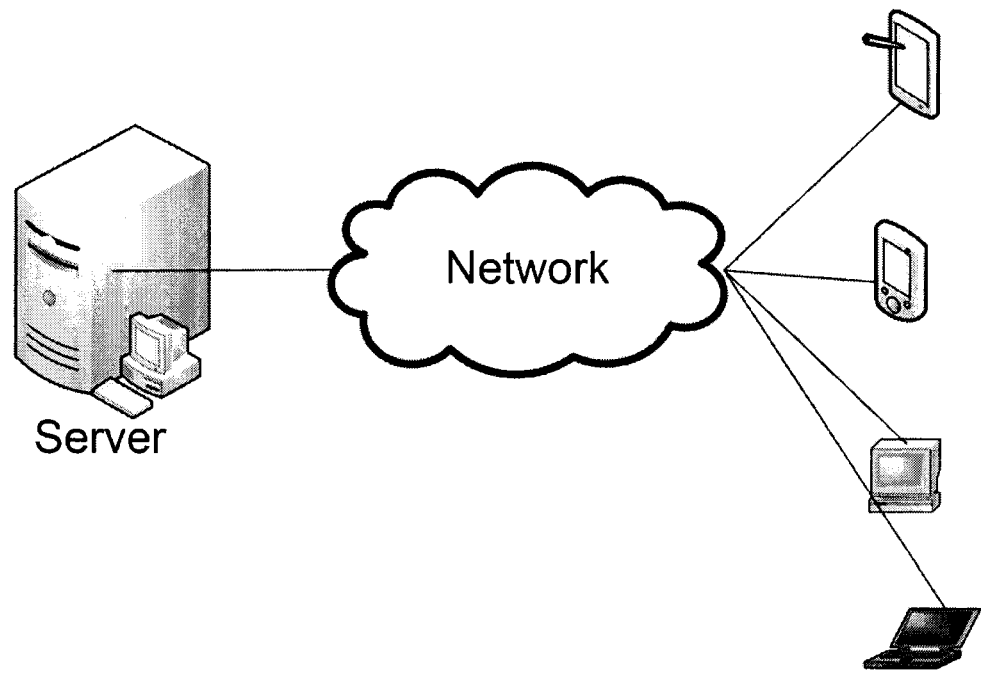
FIG. 4 is a system structural block diagram of a system for displaying a picture based on a wireless network according to a fourth embodiment of the disclosure.

This embodiment is based on the mobile terminal of the third embodiment. FIG. 4 is a system structural block diagram of a system for displaying a picture based on a wireless network according to the fourth embodiment. As shown in FIG. 4, the system for displaying a picture based on a wireless network according to the present embodiment includes a mobile terminal and a server.

The mobile terminal is configured to obtain the update time of the target picture to be displayed from the server according to the picture identifier of the target picture.

If a buffered picture with the same picture identifier as that of the target picture is present in a local buffer of the mobile terminal, the mobile terminal obtains the buffered picture from the local buffer.

If the update time of the buffered picture is the same as that of the target picture, the mobile terminal displays the buffered picture according to the picture content data of the buffered picture.

Further, if the update time of the buffered picture is different from that of the target picture, then, the mobile terminal sends to the server a picture content data request for requesting the picture content data of the target picture according to the picture identifier of the target picture; and the server receives the picture content data request, searches for the picture content data of the target picture according to the picture identifier of the target picture, and returns the picture content data of the target picture to the mobile terminal; and the mobile terminal displays the picture content data of the target picture returned by the server, and updates the buffered picture by updating the picture content data of the buffered picture as the obtained picture content data of the target picture from the server, and updating the update time of the buffered picture as the obtained update time of the target picture from the server.

In order to further accelerate the access speed, the locally stored pictures may be stored in the buffer of the mobile terminal. For example, at least one web page picture is stored in the buffer through the localStorage, where each picture is referred to as a buffered picture, which includes a picture identifier, picture content data and update time.

In this embodiment, the picture includes a picture identifier, picture content data and update time. Preferably, the latest use time of the buffered picture is recorded in the local buffer of the mobile terminal.

The buffered picture may further include the latest use time, for recording the time stamp when the stored buffered picture is used most recently. When the space of the local buffer is insufficient, a buffered picture that has not been used for a long time (i.e., a buffered picture with early latest use time) or a buffered picture that has been hit for the minimum times will be first removed, to increase the hit ratios of the buffered pictures, and hence improve the picture display efficiency at the mobile terminal.

In a preferred implementation of this embodiment, the buffered picture on the mobile terminal is stored in the buffer through the HTML5 localStorage, and each buffered picture includes a picture identifier, picture content data, update time and the latest use time. Each buffered picture is stored in the form of a character string converted from a JSON object. When the target picture is not found in the local buffer, the target picture will be obtained from the server and displayed, and stored in the buffer of the mobile terminal.

If a buffered picture with the same picture identifier as that of the target picture is present in the local buffer of the mobile terminal, but the update time of the buffered picture is different from the update time of the target picture returned by the server, the mobile terminal updates the buffered picture in the mobile terminal, which corresponds to the target picture, where the picture content data of the buffered picture is updated as the obtained picture content data of the target picture from the server, and the update time of the buffered picture is updated as the obtained update time of the target picture from the server. If the buffered picture locally stored on the mobile terminal further includes the latest use time, the latest use time of the buffered picture is updated as the current time.

If a buffered picture with the same picture identifier as that of the target picture is not present in the local buffer of the mobile terminal, the mobile terminal adds a buffered picture to the local buffer, where the picture identifier of the buffered picture is set as the picture identifier of the target picture, the picture content data of the buffered picture is set as the obtained picture content data of the target picture from the server, and the update time of the buffered picture is set as the obtained update time of the target picture from the server. If the buffered picture locally stored on the mobile terminal further includes the latest use time, the latest use time of the buffered picture is set as the current time.

As can be seen in the system for displaying a picture based on a wireless network according to the embodiment of the disclosure, the picture content data and the update time of a network picture are stored in both the server and the local buffer of the mobile terminal. To display a picture at the mobile terminal, the terminal directly extracts the picture from the local buffer if the update time of the picture is consistent with the update time obtained from the server; and if the update time of the picture is inconsistent with the update time obtained from the server, the mobile terminal extracts the picture from the server. By the technical solutions of the embodiments of the disclosure, the network traffic of a mobile terminal can be saved, the picture display speed of the mobile terminal can be improved, and the battery endurance of the mobile terminal can be improved.

An embodiment of the disclosure further provides a storage medium containing computer-executable instructions, which, when executed by a computer processor, are configured to perform a method for displaying a picture based on a wireless network, where the picture includes a picture identifier, picture content data and update time, and the method includes:

obtaining update time of a target picture to be displayed from a server according to the picture identifier of the target picture;

if a buffered picture with the same picture identifier as that of the target picture is present in a local buffer of the mobile terminal, obtaining the buffered picture; and if the update time of the buffered picture is the same as that of the target picture, displaying the buffered picture according to the picture content data of the buffered picture.

In the above storage medium, the method preferably further includes:

if the update time of the buffered picture is different from that of the target picture, obtaining the picture content data of the target picture from the server according to the picture identifier of the target picture; displaying the target picture according to the obtained picture content data of the target picture; and updating the buffered picture by updating the picture content data of the buffered picture as the obtained picture content data of the target picture, and updating the update time of the buffered picture as the obtained update time of the target picture.

In the above storage medium, preferably, the latest use time of the buffered picture is recorded in the local buffer of the mobile terminal; and the above updating the buffered picture further includes updating the latest use time of the buffered picture as the current time.

In the above storage medium, preferably, the method further includes:

if a buffered picture with the same picture identifier as that of the target picture is not present in the local buffer of the mobile terminal, then: obtaining the picture content data of the target picture from the server according to the picture identifier of the target picture; displaying the obtained picture content data of the target picture; and adding a new buffered picture to the local buffer, where the picture identifier of the new buffered picture is set as the picture identifier of the target picture, the picture content data of the new buffered picture is set as the picture content data of the target picture obtained, and the update time of the new buffered picture is set as the obtained update time of the target picture.

In the above storage medium, adding a new buffered picture to the local buffer further preferably includes: when the size of the remaining space of the local buffer is less than the size of the new buffered picture, clearing the buffered pictures one by one from the local buffer until the size of the remaining space of the local buffer is larger than that of the new buffered picture.

In the above storage medium, clearing the buffered pictures one by one from the local buffer preferably includes: when the size of the remaining space of the local buffer is less than the size of the new buffered picture, ordering the buffered pictures in the local buffer according to the latest use time of the buffered pictures, and clearing the buffered picture with the earliest latest use time one by one until the size of the remaining space of the local buffer is larger than the size of the new buffered picture.

With the description of the above embodiments, one skilled in the art may clearly understand that the disclosure may be implemented by the aid of software and necessary universal hardware; of course, the disclosure may be implemented by hardware merely. However, in many cases, the former is preferred. Based on such an understanding, the essential part of the technical solutions of the disclosure, i.e., the part that contributes to the prior art, may be embodied in the form of a software product that is stored in a computer-readable storage medium, for example, a floppy disk, a Read-Only Memory (ROM), a Random Access Memory (RAM), a FLASH, a hard disk or a compact disc of a computer, and includes instructions that are configured to instruct a computer device (which may be a personal computer, a server or a network device) to implement the methods according to various embodiments of the disclosure.

The above description only shows some preferred embodiments of the disclosure, rather than limiting the scope of the disclosure. All modifications, equivalent substitutions and improvements made without departing from the concept and principles of the disclosure should be contemplated by the protection scope of the disclosure.

What is claimed is:

1. A method for displaying a picture by a mobile terminal based on a wireless network, wherein, the picture includes a picture identifier, picture content data and update time, and the method comprises:
　obtaining update time of a target picture to be displayed from a server, according to a picture identifier of the target picture;
　if a buffered picture with the same picture identifier as that of the target picture is present in a local buffer of the mobile terminal, obtaining the buffered picture; wherein, the buffered picture is stored in a form of a character string converted from a JavaScript Object Notation object in the mobile terminal, wherein the buffered picture is stored in a buffer of the mobile terminal;
　if the update time of the buffered picture is the same as that of the target picture, displaying the buffered picture according to the picture content data of the buffered picture;
　if a buffered picture with the same picture identifier as that of the target picture is not present in the local buffer of the mobile terminal, obtaining the picture content data of the target picture from the server according to the picture identifier of the target picture; displaying the obtained picture content data of the target picture; and adding a new buffered picture to the local buffer; and
　when a size of the remaining space of the local buffer is less than a size of the new buffered picture, ordering the buffered pictures in the local buffer according to the latest use time of the buffered pictures, and clearing the buffered picture with the earliest latest use time one by one until the size of the remaining space of the local buffer is larger than the size of the new buffered picture.

2. The method of claim 1, further comprising:
　if the update time of the buffered picture is different from that of the target picture, then: obtaining the picture content data of the target picture from the server according to the picture identifier of the target picture; displaying the target picture according to the obtained picture content data of the target picture; and updating the buffered picture by updating the picture content data of the buffered picture as the obtained picture content data of the target picture, and updating the update time of the buffered picture as the obtained update time of the target picture.

3. The method of claim 2, wherein, the latest use time of the buffered picture is recorded in the local buffer of the mobile terminal.

4. The method of claim 3, wherein, the updating the buffered picture further comprises: updating the latest use time of the buffered picture as a current time.

5. The method of claim 1, wherein the picture identifier of the new buffered picture is set as the picture identifier of the target picture, the picture content data of the new buffered picture is set as the obtained picture content data of the target picture, and the update time of the new buffered picture is set as the obtained update time of the target picture.

6. A mobile terminal for performing a method for displaying a picture based on a wireless network, wherein, the picture includes a picture identifier, picture content data, and update time, the mobile terminal comprising:
　one or more processors;
　a memory;
　one or more program instructions stored in the memory and executed by the one or more processor, wherein the one or more program instructions:
　　obtain the update time of a target picture to be displayed from a server according to a picture identifier of the target picture;
　　obtain a buffered picture if a buffered picture with the same picture identifier as that of the target picture is present in a local buffer of the mobile terminal, wherein, the buffered picture is stored in a form of a character string converted from a JavaScript Object Notation object in the mobile terminal; and wherein the buffered picture is stored in a buffer of the mobile terminal;
　　display the buffered picture according to the picture content data of the buffered picture if the update time of the buffered picture is the same as that of the target picture;
　　obtain the picture content data of the target picture from the server according to the picture identifier of the target picture, and display the obtained picture content data of the target picture if a buffered Picture with the same picture identifier as that of the target picture is not present in the local buffer of the mobile terminal;
add a new buffered picture to the local buffer after the picture content data of the target picture is obtained; and
order the buffered pictures in the local buffer according to latest use time of the buffered pictures, and clear the buffered picture with the earliest latest use time one by one until the remaining space of the local buffer is larger than a size of the new buffered picture when the remaining space of the local buffer is less than a size of the new buffered picture.

7. The mobile terminal of claim 6, wherein, the one or more program instructions further:
obtain the picture content data of the target picture from the server according to the picture identifier of the target picture and display the obtained picture content data of the target picture, if the update time of the buffered picture is different from that of the target picture; and
update buffered picture by updating the picture content data of the buffered picture as the obtained picture content data of the target picture, and updating the update time of the buffered picture as the obtained update time of the target picture, after the picture content data of the target picture is obtained.

8. The mobile terminal of claim 7, wherein, the latest use time of the buffered picture is recorded in the local buffer of the mobile terminal.

9. The mobile terminal of claim 8, wherein, the one or more program instructions further update the latest use time of the buffered picture as a current time.

10. The mobile terminal of claim 6, wherein the picture identifier of the new buffered picture is set as the picture identifier of the target picture, the picture content data of the new buffered picture is set as the obtained picture content data of the target picture, and the update time of the new buffered picture is set as the obtained update time of the target picture.

11. A system for displaying a picture based on wireless network, wherein, the picture includes a picture identifier, picture content data and update time, and the system comprises a mobile terminal and a server;
the mobile terminal is configured to obtain the update time of a target picture to be displayed from the server according to the picture identifier of the target picture;
if a buffered picture with the same picture identifier as that of the target picture is present in a local buffer of the mobile terminal, the mobile terminal obtains the buffered picture; wherein, the buffered picture is stored in a form of a character string converted from a JavaScript Object Notation object in the mobile terminal; and wherein the buffered picture is stored in a buffer of the mobile terminal;
if the update time of the buffered picture is the same as that of the target picture, the mobile terminal displays the buffered picture according to the picture content data of the buffered picture;
if a buffered picture with the same picture identifier as that of the target picture is not present in the local buffer of the mobile terminal, obtaining the picture content data of the target picture from the server according to the picture identifier of the target picture; displaying the obtained picture content data of the target picture; and adding a new buffered picture to the local buffer; and when a size of the remaining space of the local buffer is less than a size of the new buffered picture, ordering the buffered pictures in the local buffer according to the latest use time of the buffered pictures, and clearing the buffered picture with the earliest latest use time one by one until the size of the remaining space of the local buffer is larger than the size of the new buffered picture.

12. The system of claim 11, wherein:
if the update time of the buffered picture is different from that of the target picture, the mobile terminal sends to the server a picture content data request for requesting the picture content data of the target picture according to the picture identifier of the target picture, and the server receives the picture content data request, searches for the picture content data of the target picture according to the picture identifier of the target picture, and returns the picture content data of the target picture to the mobile terminal; and
the mobile terminal is further configured to display the picture content data of the target picture returned by the server, and update the buffered picture by updating the picture content data of the buffered picture as the obtained picture content data of the target picture from the server, and updating the update time of the buffered picture as the obtained update time of the target picture from the server.

13. The system of claim 11, wherein, the latest use time of the buffered picture is recorded in the local buffer of the mobile terminal.

14. A non-transitory storage medium containing computer-executable instructions, which, when executed by a computer processor, are configured to perform a method for displaying a picture based on a wireless network, wherein the picture includes a picture identifier, picture content data and update time, and the method comprises:
obtaining update time of a target picture to be displayed from a server according to a picture identifier of the target picture;
if a buffered picture with the same picture identifier as that of the target picture is present in a local buffer of a mobile terminal, obtaining the buffered picture; wherein, the buffered picture is stored in a form of a character string converted from a JavaScript Object Notation object in the mobile terminal; and wherein the buffered picture is stored in a buffer of the mobile terminal;
if the update time of the buffered picture is the same as that of the target picture, displaying the buffered picture according to the picture content data of the buffered picture;
if a buffered picture with the same picture identifier as that of the target picture is not present in the local buffer of the mobile terminal, obtaining the picture content data of the target picture from the server according to the picture identifier of the target picture; displaying the obtained picture content data of the target picture; and adding a new buffered picture to the local buffer; and
when a size of the remaining space of the local buffer is less than a size of the new buffered picture, ordering the buffered pictures in the local buffer according to the latest use time of the buffered pictures, and clearing the buffered picture with the earliest latest use time one by one until the size of the remaining space of the local buffer is larger than the size of the new buffered picture.

15. The non-transitory storage medium of claim 14, wherein, the method further comprises:

if the update time of the buffered picture is different from that of the target picture, then: obtaining the picture content data of the target picture from the server according to the picture identifier of the target picture; displaying the target picture according to the obtained picture content data of the target picture; and updating the buffered picture by updating the picture content data of the buffered picture as the obtained picture content data of the target picture, and updating the update time of the buffered picture as the obtained update time of the target picture.

16. The non-transitory storage medium of claim 15, wherein, the latest use time of the buffered picture is recorded in the local buffer of the mobile terminal; and the updating the buffered picture further comprises: updating the latest use time of the buffered picture as a current time.

* * * * *